United States Patent
Elkovitch et al.

(10) Patent No.: US 12,037,492 B2
(45) Date of Patent: Jul. 16, 2024

(54) HALOGEN FREE, FLAMEPROOF, COMPATIBILIZED POLYAMIDE AND POLYPHENYLENE ETHER BLEND

(71) Applicant: TEKNOR APEX COMPANY, Pawtucket, RI (US)

(72) Inventors: Mark Elkovitch, North Ridgeville, OH (US); Richard Barnes, Collierville, TN (US)

(73) Assignee: TEKNOR APEX COMPANY, Pawtucket, RI (US)

( * ) Notice: Subject to any disclaimer, the term of this patent is extended or adjusted under 35 U.S.C. 154(b) by 34 days.

(21) Appl. No.: 17/842,231

(22) Filed: Jun. 16, 2022

(65) Prior Publication Data

US 2022/0403166 A1 Dec. 22, 2022

Related U.S. Application Data

(60) Provisional application No. 63/211,680, filed on Jun. 17, 2021.

(51) Int. Cl.
*C08L 77/02* (2006.01)
*C08L 71/12* (2006.01)

(52) U.S. Cl.
CPC .............. *C08L 77/02* (2013.01); *C08L 71/12* (2013.01); *C08L 2201/02* (2013.01)

(58) Field of Classification Search
CPC ...... C08L 71/12; C08L 71/123; C08L 71/126; C08L 77/00–06; C08L 2201/12; C08L 2205/03; C08L 2205/05; C08L 2205/08; C08L 2666/34; C08L 77/02; C08L 2201/02; C08G 65/485; C08K 3/32
See application file for complete search history.

(56) References Cited

U.S. PATENT DOCUMENTS

| | | | |
|---|---|---|---|
| 9,481,831 B2 | 11/2016 | Bauer et al. | |
| 10,273,361 B2 | 4/2019 | Choi et al. | |
| 10,717,868 B2 | 7/2020 | Choi et al. | |
| 2005/0250885 A1 | 11/2005 | Mercx et al. | |
| 2006/0058432 A1 | 3/2006 | Perego et al. | |
| 2006/0111484 A1 | 5/2006 | Fishburn | |
| 2006/0111549 A1* | 5/2006 | Elkovitch | C08L 71/12 |
| | | | 528/205 |
| 2009/0242844 A1 | 10/2009 | Elkovitch | |
| 2009/0275682 A1 | 11/2009 | Furukawa et al. | |
| 2011/0152431 A1 | 6/2011 | Elkovitch et al. | |
| 2016/0300639 A1* | 10/2016 | Choi | C08L 51/06 |
| 2018/0057685 A1 | 3/2018 | Maeda et al. | |

FOREIGN PATENT DOCUMENTS

| | | |
|---|---|---|
| CN | 109553967 A | 4/2019 |
| CN | 110698852 A | 1/2020 |

* cited by examiner

*Primary Examiner* — Ana L. Woodward
(74) *Attorney, Agent, or Firm* — Hudak, Shunk & Farine Co. LPA (57) ABSTRACT

A composition including a compatibilized blend of polyamide, polyphenylene ether and a flameproofing agent that synergistically interact such that plaques produced from the composition pass a glow wire ignition temperature test (GWIT) without producing a flame. Advantageously, the flameproofing agent is non-halogenated and the compositions also free of other halogen containing components. In addition, the compositions are free of fillers and are unexpectedly still able to pass the noted tests.

23 Claims, 1 Drawing Sheet

HALOGEN FREE, FLAMEPROOF, COMPATIBILIZED POLYAMIDE AND POLYPHENYLENE ETHER BLEND

FIELD OF THE INVENTION

The present invention relates to compositions including a compatibilized blend of polyamide, polyphenylene ether and a flameproofing agent that synergistically interact such that plaques produced from the composition pass a glow wire ignition temperature test (GWIT) without producing a flame. Advantageously, the flameproofing agent is non-halogenated and the compositions also substantially free of other halogen containing components. In addition, in some embodiments, the compositions are free of fillers and are unexpectedly still able to pass the noted test.

BACKGROUND OF THE INVENTION

Compositions including polyamides and polyphenylene ether as the majority of polymer content are used to produce molded parts for a wide variety of industries with end uses including electrical components and connectors and automotive components including exterior parts as well as parts close to the engine such as engine covers, due to exhibiting desirable properties including one or more of processability, good flame retardant performance, good stability and good mechanical properties.

Various approaches have been taken in the prior art to meet customer requirements, for example:

CN Publication No. 109553967A relates to a reportedly low-precipitation halogen-free flame-retardant polyphenylene ether-polyamide resin alloy and a preparation method thereof, wherein the raw materials comprise, by weight, 10-50% of polyphenylene ether, 15-65% of a mixed polyamide resin including polyamide 66 and polyamide MX derived from m-xylylene diamine and a diacid, 5-25% of a halogen-free flame retardant, 3-15% of a compatibilizer that is maleic anhydride grafted polystyrene-polyethylene-polybutene-polystyrene linear triblock copolymer or maleic anhydride grafted polyphenylene ether, 3-15% of a toughening agent of polystyrene-polyethylene-polybutene-polystyrene linear triblock copolymer, 0.1-0.5% of an antioxidant, 0.2-0.6% of a nucleating agent, and 0.5-1% of other processing aids. The prepared material can reportedly meet the high-glow wire light-off temperature in a high-temperature and high-humidity environment, does not burn at a temperature of 800° C. during the process, and has the low migration or precipitation of the flame retardant under severe conditions; and the prepared low-precipitation halogen-free flame-retardant polyphenylene ether-polyamide resin alloy material reportedly integrates good flame retardant performance, good mechanical property and good size stability.

CN Publication No. 110698852A relates to a flame-retardant reinforced polyamide 6/polyphenyl ether composition prepared from the following raw materials: low-viscosity polyamide 6 resin, high-viscosity polyphenyl ether resin, low-viscosity polyphenyl ether resin, styrene and glycidyl methacrylate copolymer, toluene diisocyanate, hydrogenated styrene-isoprene copolymer grafted maleic anhydride, N,N'-bis (2,2,6,6-tetramethyl-4-piperidyl)-1,3-benzenedicarboxamide, bis (2,6-di-tert-butyl-4-methylphenyl) pentaerythritol diphosphate, pentaerythritol zinc, a silane coupling agent, a layered silicate, an alkyl phosphinate, a melamine polyphosphate and alkali-free glass fibers. The composite material is prepared from the flame-retardant reinforced polyamide 6/polyphenyl ether composition reportedly has excellent mechanical properties, processability and flame retardancy, and can be used for manufacturing automobiles, electronic and electrical components and the like.

U.S. Publication No. 2018/057685 relates to a resin composition reportedly having excellent flame retardance, molding processability, and post-heat aging flame retardance. The composition contains: (A) a polyphenylene ether; (B) at least one thermoplastic resin selected from the group consisting of (B-1) a polystyrene resin, (B-2) a polyamide resin, (B-3) a polypropylene resin, and (B-4) a polyphenylene sulfide resin; and (C) a flame retardant. The (A) component has a content of less than 50 mass % when the flame-retardant resin composition minus ash content is taken to be 100 mass %. The flame-retardant resin composition has a flame retardance level of V-0 as measured by a UL 94 vertical burning test. A molded article formed from the flame-retardant resin composition exhibits a rate of change of chloroform-insoluble content of no greater than 15 mass % before and after being subjected to aging in which the molded article is left for 1,000 hours at 150° C. in an atmospheric environment.

U.S. Publication No. 2009/027582 relates to a resin composition containing (A) a polyamide having a viscosity number (as measured in the 96% sulfuric acid according to ISO 307 (1997)) of from 50 ml/g to 250 ml/g; (B) a polyphenylene ether; and (C) a phosphinate represented by a particular formula. The resin composition is reportedly excellent in flame retardancy, impact resistance and thin-wall moldability and reportedly can significantly suppress gas generation during the molding process and substantially inhibit the generation of deposits on a mold during injection molding. As a result, a molded product thereof excellent in surface appearance reportedly can be provided.

Additional approaches include flame retarding unfilled polyamide using the non-halogenated flame retardant melamine cyanurate. This technology works very well for UL94V0 flame retardant requirements. However, when applied to glow wire testing, flames are produced. Such formulations can produce molded plaques that can still pass the IEC 60695-2-13 test, as the flame will extinguish in less than <5 seconds.

Still further, halogenated flame retardant technologies such as brominated polystyrene combined with antimony trioxide will often not produce a flame when used in a non-glass filled polyamide formulation. This technology is typically excellent in the vapor phase, in other words acts to prevent ignition of degraded substances that go into the vapor phase as a result of the part burning and therefore helps pass the GWIT test with no flame. However, halogenated formulations must not be utilized according to various customer and regulatory requirements.

Even in view of the above, industry still needs improved compositions which are unfilled as many connectors contain parts such as flanges or latches that need good ductility to function properly. This is generally a difficult task to accomplish. For example, adding glass fiber to a polymeric-based formulation reduces flammability, but often makes the parts more brittle, thus making latches and flanges break very easily. The art also still needs compositions that do not produce a flame when molded into a part and/or plaque and tested according to standardized glow wire testing.

SUMMARY OF THE INVENTION

The problems of the prior art discussed above and others are solved by the present invention compositions, which are, non-halogenated, compatibilized polyamide and polyphenylene ether blends that include a flameproofing agent and pass the GMT IEC 60695-2-13 plaque test at thicknesses up to and including 2.0 mm at various temperatures such as at least 700° C., 750° C., 775° C., and 800° C. or more without producing a flame, the latter being a more restrictive, added provision not required by the test specifications. For the sake of clarity, the terms "without producing a flame," "flameproof", "no flame" and the like require the specimen tested to not ignite and not produce any flame visible to the human eye during any application of the glow wire according to the particular test method.

The compositions in various embodiments are also able to pass UL94 V0 requirement from 0.4 mm to 3.0 mm and UL5VA requirements from 1.5 mm to 3.0 mm.

It is very unexpected that the compositions of the present invention, and parts produced therefrom, pass such stringent non-flame requirements in view of the composition lacking halogen-containing flame retardants and, in some embodiments, reinforcing fillers. Small parts for applications as described herein are preferably produced by injection molding and integrate design features such as flanges, sockets, latches, retention features and various contours that must be stable and have longevity. A highly specific defined range of polyamide (co)polymer is utilized to provide mechanical strength and processability. The defined range of polyphenylene ether does not detract from the properties imparted by the polyamide (co)polymer, is useful in forming a char layer and essentially prevents degraded or burned chemical moieties from contributing to a reaction that causes a flame. Still further, a synergistic amount of a flameproofing agent enhances the compositions and ensures that no flame is produced according to the modified tests of the invention.

Therefore, in one aspect a halogen free, flameproof, compatibilized polyamide and polyphenylene ether blend composition is disclosed, comprising: a polyamide (co)polymer present in an amount from about 30 to about 80 parts, based on 100 parts by weight of the composition, wherein the polyamide (co)polymer is present as a continuous phase in the composition; polyphenylene ether in an amount from about 15 to about 50 parts based on 100 total parts by weight of the composition; a block copolymer compatibilizer derived from a i) the polyamide (co)polymer, ii) the polyphenylene ether, and a iii) a compatibilizer containing two different types of functional groups including a first functional group reactable with the i) polyamide (co)polymer and a second functional group readable with the ii) polyphenylene ether, wherein the compatibilizer is present in an amount of from about 0.1 to about 5 parts based on 100 parts by weight of the composition; a flameproofing agent that is a phosphinate present in an amount of from about 5 to about 35 parts based on 100 parts by weight of the composition; wherein the composition is free of a halogen-containing flameproofing agent, and wherein a plaque or plate prepared from the composition passes a test according to GWIT IEC 60695-2-13 with no flame at 700° C. at thickness of 2.0 mm.

In a further aspect, the polyamide (co)polymer is one or more of polyamide 6; polyamide 6,6; polyamide 4,6; polyamide 11; polyamide 12; polyamide 6,10; polyamide 6,12; polyamide 6/6,6; polyamide 6/6, 12; polyamide MXD (m-xylylenediamine),6; polyamide 6,T; polyamide 9,T; polyamide 6,I; polyamide 6/6,T; polyamide 6/6,I; polyamide 6,6/6T; polyamide 6, 6/6,I; polyamide 6/6,T/6,I; polyamide 6,6/6, T/6,I; polyamide 6/12/6,T; polyamide 6,6/12/6,T; polyamide 6/12/6,I; and polyamide 6,6/12/6,I.

In still another aspect, the flameproofing agent is one or more of aluminum diethyl phosphinate, zinc diethyl phosphinate calcium diethyl phosphinate, magnesium diethyl phosphinate, aluminum dipropyl phosphinate, isopropyl phosphinate, aluminum butyl phosphinate, aluminum methyl ethyl phosphinate, and aluminum phenyl phosphinate.

In another aspect, the composition is free of fillers.

In a further aspect, the plaque or plate prepared from the composition passes the test according to GWIT IEC 60695-2-13 with no flame at 750° C. at thickness of 2.0 mm.

In still another aspect, the plaque or plate prepared from the composition passes a test according to GWIT IEC 60695-2-13 with no flame at 800° C. at thickness of 2.0 mm.

In another aspect, the polyamide (co)polymer is present in an amount from about 30 to about 70 parts, based on 100 parts by weight of the composition, wherein the polyphenylene ether is present in an amount from about 15 to about 50 parts based on 100 total parts by weight of the composition, wherein the compatibilizer is present in an amount of from about 0.2 to about 4 parts based on 100 parts by weight of the composition, and wherein the flameproofing agent is present in the amount of from about 7.5 to about 30 parts based on 100 parts by weight of the composition.

In a further aspect, the polyamide (co)polymer is present in an amount from about 32 to about 65 parts, based on 100 parts by weight of the composition, wherein the polyphenylene ether is present in an amount from about 20 to about 45 parts based on 100 total parts by weight of the composition, wherein the compatibilizer is present in an amount of from about 0.25 to about 3 parts based on 100 parts by weight of the composition, and wherein the flameproofing agent is present in the amount of from about 10 to about 25 parts based on 100 parts by weight of the composition.

In still another aspect, the composition further includes a lubricant.

In another aspect, the polyphenylene ether is present as a discontinuous phase in the blend.

In a further aspect, the polyphenylene ether is one or more of poly(2,6-dimethyl-1,4-phenylene ether), poly(2-methyl-6-ethyl-1,4-phenylene ether), poly(2-methyl-6-phenyl-1,4-phenylene ether), and a copolymer of 2,6-dimethylphenol and another phenol.

In still another aspect, the compatibilizer is one or more of maleic acid, maleic anhydride, fumaric acid, citric acid, and citric anhydride.

In another aspect, the first functional group is one or more of a carbon-carbon double bond and a carbon-carbon triple bond, and wherein the section functional group is one or more of a carboxyl group, an acid anhydride, an epoxy group, an amide group, an ester group, and an acid chloride.

In still another aspect, the polyamide copolymer has an amine group concentration of greater than or equal to 50 m.equivalents/kg.

In another aspect, the polyamide copolymer has an amine group concentration of greater than or equal to 60 m.equivalents/kg.

In another aspect, a method for forming the blend composition is disclosed, comprising the steps of: reacting the compatibilizer with a portion of the polyamide copolymer and the polyphenylene ether thereby forming the block copolymer compatibilizer.

In a further aspect, the method includes reacting a portion of the polyphenylene ether with a compatibilizing agent prior to mixing with the polyamide.

In still another aspect, the blend is extruded, wherein a portion of the polyphenylene ether and compatibilizing agent are combined in an upstream feed location and the polyamide is added downstream after the portion of the polyphenylene ether and compatibilizer have been reacted.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
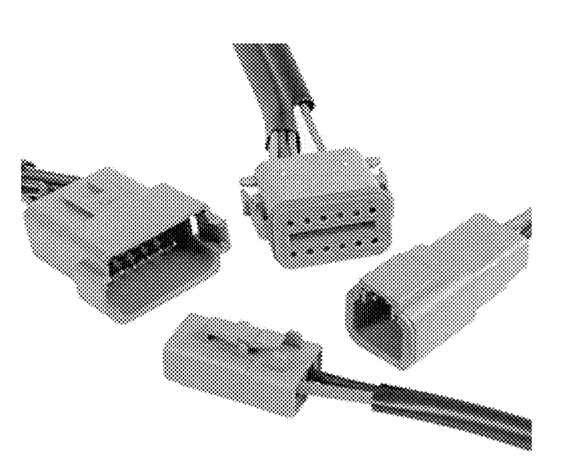
The FIGURE illustrates a black and white image of a plurality of different connectors that can be produced by the compositions of the present invention.

In this specification, all numbers disclosed herein designate a set value, individually, in one embodiment, regardless of whether the word "about" or "approximate" or the like is used in connection therewith. In addition, when the term such as "about" or "approximate" is used in conjunction with a value, the numerical range may also vary, for example by 1%, 2%, or 5%, or more in various other, independent, embodiments. All ranges set forth in the specification and claims not only include the end points of the ranges but also every conceivable number between the end points of the ranges.

The term "polymer" and "(co)polymer", as used herein, refer to a polymeric compound prepared by polymerizing monomers whether of the same or a different type. As used herein, said terms embrace the terms "homopolymer", "copolymer", "terpolymer" and "interpolymer". The term "interpolymer" as used herein refers to polymers prepared by the polymerization of at least two different types of monomers.

The compositions and/or parts, see the FIGURE for non-limiting examples, produced by the compositions of the present invention pass GWIT IEC 60695-2-13, and GWFI IEC 60695-2-12 tests without producing a flame, even though the composition are free of halogen-containing flame retardants and any other halogen containing components, and are also free of fillers in some embodiments.

Polyamide

A polyamide (co)polymer is present in the compositions of the invention. Polyamides typically exhibit properties such as good chemical resistance, mechanical strength and processability, with polyamides having excellent injection moldability. However, some polyamides have less than desirable heat resistance and dimensional stability.

The polyamides of the invention are utilized in a sufficient amount so that they form the continuous phase of the composition. For the sake of clarity, even though the polyamide forms the continuous phase, it can be present in amounts less than 50% by weight based on the total weight of the composition. From a microstructure standpoint, it is believed the polyamide and polyphenylene ether have a sea and island structure, with the polyphenylene ether being the discontinuous islands in the polyamide sea.

Polyamide (co)polymers suitable for use in the present invention are generally obtained by the ring-opening polymerization of a lactam, the polycondensation of a diamine and a dicarboxylic acid, the polycondensation of an w-aminocarboxylic acid, or the like. However, the polyamide of the present invention is not intended to be limited to resins obtained by these processes.

Examples of the above-mentioned diamine include the three primary categories of diamines: aliphatic, alicyclic and aromatic diamines. Specific examples of the diamines include aliphatic diamines such as tetramethylenediamine, hexamethylenediamine, undecamethylenediamine, dodecamethylenediamine, tridecamethylenediamine, 2,2,4-trimethylhexamethylenediamine, 2,4,4-trimethylhexamethylenediamine, 5-methylnonamethylenediamine, 1,9-nonanediamine, 2-methyl-1,8-octanediamine, ethylenediamine, propylenediamine, 1,4-butanediamine, 1,6-hexanediamine, 1,8-octanediamine, 1,10-decanediamine, 1,12-dodecanediamine, 3-methyl-1,5-pentanediamine, 2,2,4-trimethyl-1,6-hexanediamine, 2,4,4-trimethyl-1,6-hexanediamine, and 5-methyl-1,9-nonanediamine; 1,3-bisaminomethylcyclohexane; 1,4-bisaminomethylcyclohexane; m-phenylenediamine; p-phenylenediamine; m-xylylenediamine; and p-xylylenediamine.

Examples of the dicarboxylic acid may include the three primary categories of dicarboxylic acids: aliphatic, alicyclic and aromatic dicarboxylic acids. Specific examples of the dicarboxylic acid include adipic acid, suberic acid, azelaic acid, sebacic acid, dodecanedioic acid, 1,1,3-dodecanedioic acid, 1,3-cyclohexanedicarboxylic acid, terephthalic acid, isophthalic acid, naphthalene dicarboxylic acid, and dimer acid.

Specific examples of the lactam include ϵ-caprolactam, enantholactam, and ω-laurolactam.

Specific examples of the aminocarboxylic acid include ϵ-aminocaproic acid, 7-aminoheptanoic acid, 8-aminooctanoic acid, 9-aminonanoic acid, 11-aminoundecanoic acid, 12-aminododecanoic acid, and 13-aminotridecanoic acid.

According to the present invention, the lactam, diamine, dicarboxylic acid and ω-aminocarboxylic acid may be polycondensed alone, or used in the form of a copolyamide obtained by the polycondensation of a mixture of two or more thereof.

A product can also be suitably used which is obtained by polymerizing the lactam, diamine, dicarboxylic acid or ω-aminocarboxylic acid until the stage of a low molecular weight oligomer in a polymerization reactor, followed by converting the oligomer into a high molecular weight polymer using an extruder or the like.

Examples of the polyamides which are particularly suitable for use in the present invention include polyamide 6; polyamide 6,6; polyamide 4,6; polyamide 11; polyamide 12; polyamide 6,10; polyamide 6,12; polyamide 6/6,6; polyamide 6/6, 12; polyamide MXD (m-xylylenediamine), 6; polyamide 6,T; polyamide 9,T; polyamide 6,I; polyamide 6/6,T; polyamide 6/6,I; polyamide 6,6/6T; polyamide 6, 6/6,I; polyamide 6/6,T/6,I; polyamide 6,6/6, T/6,I; polyamide 6/12/6,T; polyamide 6,6/12/6,T; polyamide 6/12/6,I; and polyamide 6,6/12/6,I. Polyamides may also be used, each of which is obtained by copolymerizing a plurality of polyamides of the above polyamides using an extruder or the like.

Among these, preferred polyamides are aliphatic polyamides such as polyamide 6; polyamide 6, 6; polyamide 4,6; polyamide 11; and polyamide 12; and semiaromatic polyamides such as polyamide 9,T; polyamide 6/6,T; polyamide 6,6/6,T; polyamide 6,6/6,I; and polyamide MXD,6 and combination thereof. Most preferred is at least one polyamide selected from the group consisting of polyamide 6,6; polyamide 6; polyamide 66/6, and combinations thereof. Polyamide 6I/6I can also be added as a second polyamide to help boost other properties such as improved moisture resistance, better surface aesthetics, and improved FR. Copolymers such as polyamide 66/6T with T ratios from 20-40% are suitable as well.

The polyamides have melting points that generally range from about 200° C. to about 280° C., but can be higher or lower depending upon customer requirements and products being produced from compositions of the invention. The melting temperature for polyamide 66 is about 262° C. The melting temperature for polyamide 6 is about 220° C. The melting point for polyamide 66 is typically greater than 240° C. but depends upon the ratio of polyamide 6 to polyamide 66. Melting temperature for polyamide 66/6T copolymer is generally greater than 262° C. and is useful for desired applications that require higher temperatures.

The polyamides in preferred embodiments have amine groups (—NH$_2$) available at the end of a polymer chain. The amine group reacts with a functional group of the compatibilizer, for example an anhydride group. To that end, amine groups are present in the polyamide (co)polymer at a concentration of generally greater than 50 m.equivalents/kg, desirably greater than 60 m.equivalents/kg and preferably greater than 70 m.equivalents/kg.

Suitable polyamide (co)polymers are available from a various manufacturers including, but not limited to, Ascend, BASF, Bayer, DuPont, Invista, Nilit, Polytechnyl and Shakespeare.

Polyamide (co)polymers are used in the compositions of the present invention in amounts that synergistically interact with the polyphenylene ether and flameproofing agent to pass the GWIT test without producing a flame. The polyamide (co)polymers are utilized in amounts that range generally from about 30 to about 80 parts, desirably from about 30 to about 70 parts and preferably from about 32 to about 65 or about 35-45 parts, based on 100 total parts by weight of the composition.

Polyphenylene Ether

Polyphenylene ether is an essential component of the compositions of the present invention and is a polymer or copolymer having a repeating structure unit represented by the following formula:

wherein O denotes an oxygen atom, and each R independently represents hydrogen, a primary or secondary C1-C7 alkyl group, a phenyl group, C1-C7 aminoalkyl group, C1-C7 hydrocarbyloxy group. Mixtures of polyphenylene ethers can be used.

Specific examples of the polyphenylene ether according to the present invention include poly(2,6-dimethyl-1,4-phenylene ether), poly(2-methyl-6-ethyl-1,4-phenylene ether), poly(2-methyl-6-phenyl-1,4-phenylene ether), and the like. Additional examples include polyphenylene ether copolymers, such as a copolymer of 2,6-dimethylphenol and another phenol (for example, a copolymer of 2,3,6-trimethylphenol and a copolymer of 2-methyl-6-butylphenol).

Among these, especially preferred polyphenylene ethers include poly(2,6-dimethyl-1,4-phenylene ether.

The polyphenylene ether is utilized in amounts sufficient to aid the parts produced from the composition in forming a char layer and below amounts which impact flowability of the composition being molded, which makes molding small connectors very difficult.

The polyphenylene ether is present in the compositions of the invention in an amount generally from about 10 to about 55 parts, desirably from about 15 to about 50 parts, and preferably in an amount from about 20 to about 45 parts based on 100 total parts by weight of the composition.

Compatibilizer

A compatibilizer is included the compositions of the present invention for increasing compatibility between the polyamide and the polyphenylene ether. The compatibilizer includes a first functional group that reacts with the polyphenylene ether and also includes a second functional group thereon which is able to react with a functional group, such as an acid group, on the polyamide. The compatibilizer reduces brittleness of the composition. For example, the compatibilizer such as citric acid, fumaric acid, or maleic anhydride, etc. reacts with the polyphenylene ether. This functionalization effectively puts an anhydride group on the end of the polyphenylene ether polymer chain. This anhydride group reacts with the amine group that is already available on the end of the polyamide polymer chain. As described hereinabove, the polyamide (co)polymers in the present invention have a desirable concentration of amine end groups which helps drive the reaction.

In a preferred embodiment, one of the functional groups is a carbon-carbon double bond or a carbon-carbon triple bond, and the other type is a carboxyl group, an acid anhydride, an epoxy group, an imide group, an amide group, an ester group, or an acid chloride, and functional equivalents thereof.

Examples of the compatibilizer include, but are not limited to, maleic acid, maleic anhydride, maleic hydrazide, unsaturated dicarboxylic acid, fumaric acid, citric acid, citric anhydride, malic acid, and agaric acid. These may be used alone or as a mixture thereof.

Preferably, the compatibilizer is maleic acid, maleic anhydride, fumaric acid, citric acid, or citric anhydride. Particularly, maleic anhydride, citric acid or citric anhydride is most preferred.

The compatibilizer or a modified compound of the compatibilizer generates a polyphenylene ether/polyamide block copolymer through reaction with some of the polyphenylene ether and some of the polyamide.

The polyphenylene ether/polyamide block copolymer is distributed at an interface between the two (co)polymers in the polyamide/polyphenylene ether-containing composition to stabilize morphology of the polymer composition. Particularly, in the morphology of the polyamide/polyphenylene ether polymer composition in which the polyphenylene ether forms particles (dispersed phases) and the polyamide forms a matrix (continuous phase), it appears that the polyphenylene ether/polyamide block copolymer plays an important role in regulating the particle diameters of the particles.

In the compositions of the invention, the compatibilizer is present in an amount of about 0.1 parts to about 5 parts by weight, desirably from about 0.2 to about 4 parts, and preferably in an amount from about 0.25 to about 3 parts based on 100 total parts by weight of the composition. If the content of the compatibilizer is too low, the composition can have insignificant improvement in impact resistance, and if the content is too high, the compatibilizer can deteriorate other physical properties without improvement in impact resistance.

Flameproofing Agent

The flameproofing agent utilized in the compositions of the present invention is halogen-free and is a phosphorous-containing compound, preferably a phosphinate.

Suitable phosphinates are represented by formula (I) below. These phosphinates are essentially monomeric compounds, but also include a polymeric phosphinate which is a condensation product having a condensation degree of from 1 to 3 under some environments depending on the reaction conditions.

wherein $R^1$ and $R^2$ are the same or different and each represent straight-chain or branched $C_1$ to $C_6$ alkyl and/or aryl, or phenyl; M is calcium, magnesium, aluminum, zinc, bismuth, manganese, sodium, potassium, on a protonated nitrogenous base; and m is 1, 2 or 3.

Specific examples of phosphinic acids used to form the phosphinate include dimethyiphosphinic acid, ethylmethylphosphinic acid, diethylphosphinic acid, methyl-n-propylphosphinic acid, methanedi(methylphosphinic acid), benzene-1,4-(dimethylphosphinic acid), methylphenylphosphinic acid, diphenylphosphinic acid, and mixtures thereof.

The metal component preferably uses at least one of calcium (ion), magnesium (ion), aluminum (ion), zinc(ion), bismuth (ion), manganese (ion), sodium (ion), potassium (ion), and a protonated nitrogenous base. More preferred is the at least one of calcium (ion), magnesium (ion), aluminum (ion), and zinc (ion).

Specific examples of phosphinates include calcium dimethylphosphinate, magnesium dimethylphosphinate, aluminum dimethylphosphinate, zinc dimethylphosphinate, calcium ethylmethylphosphinate, magnesium ethylmethyiphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methanedi(methylphosphinate), magnesium methanedi(methylphosphinate), aluminum methanedi(methylphosphinate), zinc methanedi(methylphosphinate), calcium benzene-1,4-(dimethylphosphinate), magnesium benzene-1,4-(dimethylphosphinate), aluminum benzene-1,4-(dimethylphosphinate), zinc benzene-1,4-(dimethylphosphinate), calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, and zinc diphenylphosphinate.

Particularly preferred are calcium dimethylphosphinate, aluminum dimethylphosphinate, zinc dimethylphosphinate, calcium ethylmethylphosphinate, aluminum ethylmethyiphosphinate, zinc ethylmethyiphosphinate, calcium diethylphosphinate, aluminum diethylphosphinate, and zinc diethylphosphinate. Among others, aluminum diethylphosphinate is particularly preferable.

The flameproofing agent is present in an amount generally from about 5 to about 35 parts, desirably from about 7.5 to about 30 parts, and preferably from about 10 to about 25 parts based on 100 total parts by weight of the composition.

Processing Aids

The compositions of the present invention can also include processing aids, each in a sufficient amount to obtain, alone, or in combination with other components, a desired property. Such additives are well known to those of ordinary skill in the art and are described in various references regarding polymeric materials, see for example the Modern Plastics Handbook and Additives for Plastics Handbook. Various additives that can be included in the compositions of the present invention include, but are not limited to, colorants, pigments, plasticizers, lubricants, UV stabilizers, light stabilizers, thermal stabilizers, antioxidants, antistatic agents, biocides, surfactants, and combinations thereof.

The additives can be utilized in various amounts to impart a desired property to the compositions. Thus, ranges of individual additives within a composition can vary.

Free of Fillers—Select Embodiments

In an important aspect of the present invention, the inventors have discovered that compositions comprising compatibilized blends of the described polyamides, polyphenylene ether and flameproofing agent can pass the glow wire ignition temperature (GWIT) IEC 60695-2-13 plaque test at thicknesses of 2.0 mm at temperatures of 800° C. and less without producing a flame, without including any fillers. It is very surprising that passing grades can be achieved for each of the tests as fillers are often used in blends of polyamides and polyphenylene ether to provide reinforcement and/or contribute flame retardant properties to such compositions.

That said, the compositions of the present invention in preferred embodiments are free of any added fillers, including inorganic fillers, organic fillers and bio-based fillers. Examples of fillers include, but are not limited to, glass such as glass fiber and glass powders; clays, such as, but not limited to bentonite, halloysite, montmorillonite and smectite, and kaolin; metal powders; talc; titanium oxide; wollastonite, zinc oxide, carbon fibers, cellulose, graphite, lignin and carbon nanotubes.

Halogen Free

The compositions of the present invention do not include any halogen-containing flameproofing agents and flame retardants and are preferably free of any other components which include halogen. Accordingly, the term "halogen-free" and similar terms mean that the composition or component referred to, such as a part, molding or the like, are without or substantially without halogen content, i.e., contain less than 2,000 mg/kg of halogen as measured by ion chromatography. Halogen content of less than this amount is considered inconsequential to the efficacy of the composition and parts prepared therefrom.

Compositional Limitations

In view of the excellent properties imparted by the components of the compositions of the present invention, namely polyamide, polyphenylene ether, flameproofing agent and compatibilizer, no further compatibilizers or toughening agents are necessary nor included in the compositions. For example, the compositions are additionally free of polystyrene-containing copolymers including, but not limited to, maleic anhydride grafted polystyrene-polyethylene-polybutylene-polystyrene linear triblock copolymer, maleic anhydride grafted polyphenylene ether and polystyrene-polyethylene-polystyrene linear triblock copolymer.

Composition Properties

The compositions of the present invention exhibit many desirable properties sought after by manufacturers of various parts. They are flame retardant and even meet stringent no flame requirements that exceed passing test grades for certain tests as described herein. The compositions are also impact resistant, have desirable heat deflection temperatures, tensile strength, as well as flexural modulus and flexural strength.

In view of the components utilized, the compositions are readily moldable via injection molding and produce molded products having excellent surface appearances.

Product safety is important in every industry, especially for electrical and electronics applications. Many different methods have been developed to measure fire resistance and flammability of materials. Testing methods include the use of both direct flames and indirect flames. The UL 94 specification utilizes a direct flame which is applied to a vertically or horizontally mounted specimen under specified conditions. Glow wire tests are some of the most important indirect tests for electrical and electronic applications and are examples of indirect flame testing methods.

Test results from applying both direct and indirect flame testing methods show a composition's tendency to resist flaming or ignition, self-extinguish flames when ignition occurs and the ability to not spread fire through dripping.

Glow wire testing is used to simulate glowing wires inside component assemblies which can be caused by an overloaded connection or a component that is overheating. Glow wire test methodologies are covered in the IEC 60695-2 series of specifications. In general, glow wire testing is performed by energizing a heating element, i.e., glow wire, to a pre-determined temperature. The heating element is then inserted and pressed into the specimen under a required force for a required period of time. Results are recorded and assessed according to the individual standards. Glow wire testing is performed on both end products and plaques or plates prepared from desired compositions.

GWEPT is an abbreviation for a glow wire on end product test performed according to IEC 60695-2-11. The GWEPT test is performed on an actual part molded from a desired composition. The compositions of the present invention, when molded into a product or article, pass the GWEPT test according to the IEC 60695-2-11 and do not ignite or otherwise produce a flame during the testing procedure.

The compositions of the present invention also produce test plaques or plates that pass the GWIT test, namely the glow wire ignition temperature test according to IEC 60695-2-13, also with no flame at temperatures at 700° C., 750° C. and/or 800° C. at thicknesses of 2.0 mm.

Still further, the compositions of the present invention when tested according to UL 94 VO requirements also pass at thicknesses from 0.4 mm to 3.0 mm.

In addition, the compositions of the present invention when tested also pass UL5 VA requirements at thicknesses between 1.5 mm to 3.0 mm.

Preparation Methods

The compositions of the present invention can be prepared utilizing standard processing equipment, for example extruders including single-screw and twin-screw extruders; roller mills; kneaders; Brabenders; and Banbury mixers.

Processing temperatures are selected so that the compositions can be melt mixed below the decomposition points of the components, with temperatures normally ranging from about 275 to about 315° C.

In one embodiment, a multistep or multistage process is utilized, with a first step comprising reacting at least some of the polyphenylene ether with the compatibilizing agent. In this step, a desired amount of the polyphenylene ether and compatibilizing agent are combined and mixed, preferably at a temperature between 275 and 315° C. When performed in an extruder, the polyphenylene ether and compatibilizer are combined in an upstream feed location. The polyamide is added downstream, preferably after providing enough time for the polyphenylene ether and compatibilizer to react.

Other desired components are added to the extruded at desired feed locations and the composition components are subjected to melt mixing and processing into a suitable form prior to being converted into an end product, such as utilizing injection molding. An injection molding machine was utilized to mold test specimens for material property characterization. Typical melt processing temperatures are between 290-320° C.

EXAMPLES

The examples set forth below are provided to illustrate the features of the compositions of the present invention and are not intended to limit the scope of the invention.

The following raw materials were utilized for the examples.

| | |
|---|---|
| Polyamide 1 | U4591 from Invista (polyamide 6,6) |
| Polyamide 2 | Polynil ® P50/H2 from Nilit (polyamide 6,6) |
| PPE | Blue Star LXR040 from Nantong Xingchen Synthetic Material |
| Compatibilizer | Citric Acid |
| Flameproofing Agent | Exolit OP1400 from Clariant |
| Lubricant 1 | Pentaerythritol tetrastearate from Faci S.p.A. |
| Lubricant 2 | Aksab CA-35 Calcium Stearate from Semfa Group |

The following protocols were used for testing.

| Test | Units | Test Method |
|---|---|---|
| GWIT with no flame | Pass/Fail | IEC 60695-2-13 |
| GWFI | ° C. | IEC 60695-2-12 |
| UL 94 VB | V-O Pass/Fail | UL94 |
| Moisture | % | ISO 15512(B) |
| HDT @ 1.8 MPa | ° C. | ISO 75-1 |
| Density | g/cm3 | ISO 1183-1 |
| impact, notched IZOD | KJ/m2 | ISO 180/A |
| Tensile Strength | MPa | ISO 527-1/-2 |
| Elongation @ break | % | ISO 527-1/-2 |
| Elongation @ yield | % | ISO 527-1/-2 |
| Linear Shrinkage | % | ASTM D955 |
| Flex Modulus | MPa | ISO 178 |
| Flex Strength | MPa | ISO 178 |
| Ash | % | ISO 3451 |
| Melt Flow | g/10 min | ASTM D1238 |

The following compositions were prepared according to the procedure set forth above and tested as noted in the tables below.

TABLE 1

|  | Comp 1 | Comp 2 | Comp 3 | Ex. 1A | Ex. 1B | Ex. 2A | Ex. 2B | Ex. 2C | Ex. 3A | Ex. 3B | Ex. 3C |
|---|---|---|---|---|---|---|---|---|---|---|---|
| Polyamide 1 | 84.6 | 81.1 | 77.6 | 69.6 | 57.1 | 66.1 | 53.6 | 41.1 | 62.6 | 50.1 | 37.6 |
| PPE | 0.0 | 0.0 | 0.0 | 14.7 | 26.95 | 14.7 | 26.95 | 39.2 | 14.7 | 26.95 | 39.2 |
| Compatibilizer | 0.0 | 0.0 | 0.0 | 0.3 | 0.55 | 0.30 | 0.55 | 0.80 | 0.30 | 0.55 | 0.80 |
| Flameproofing Agent | 15.0 | 18.5 | 22.0 | 15.0 | 15.0 | 18.5 | 18.5 | 18.5 | 22.0 | 22.0 | 22.0 |
| Lubricant 1 | 0.4 | 0.4 | 0.4 | 0.4 | 0.4 | 0.4 | 0.4 | 0.4 | 0.4 | 0.4 | 0.4 |
| Total Parts (weight) | 100 | 100 | 100 | 100 | 100 | 100 | 100 | 100 | 100 | 100 | 100 |
| Moisture | 0.01 | 0.07 | 0.05 | 0.04 | 0.06 | 0.09 | 0.09 | 0.18 | 0.02 | 0.04 | 0.12 |
| Ash | 5.6 | 6.3 | 7 | 4.6 | 5.7 | 7.1 | 7.7 | 7.8 | 9.1 | 8.7 | 9.4 |
| Melt Flow @ (285° C./2.16 kg) | 66 | 41 | 36 | 45 | 33 | 40 | 22 | 12 | 21 | 12 | 5 |
| GWFI @ 2.0 mm | 960 | 960 | 960 | 960 | 960 | 960 | 960 | 960 | 960 | 960 | 960 |
| GWIT with no flame @ 650° C. @ 2.0 mm | Pass | Pass | Pass | Pass | Pass | Pass | Pass | Pass | Pass | Pass | Pass |
| GWIT with no flame @ 700° C. @ 2.0 mm |  |  |  | Pass | Pass | Pass | Pass | Pass | Pass | Pass | Pass |
| GWIT with no flame @ 750° C. @ 2.0 mm |  |  |  |  | Pass |  | Pass | Pass |  | Pass | Pass |
| GWIT with no flame @ 800° C. @ 2.0 mm @ 2.0 mm |  |  |  |  |  |  |  | Pass |  |  | Pass |
| HighestPassing Temperature (° C.) | 675 | 675 | 675 | 725 | 775 | 725 | 775 | 825 | 725 | 775 | 825 |

The examples set forth in Table 1 set illustrate the novelty and inventive step of the compositions of the present invention. Comparative Example 1 illustrates that a composition including a polyamide and flameproofing agent are able to pass the GWIT test with no flame @650° C. One of ordinary skill in the art would expect a composition including more flameproofing agent to pass the test at a higher temperature. This is not the case as evidenced by Comparative Examples 2 and 3 which include 18.5 and 22% flameproofing agent, respectively.

The inventive examples illustrate that in order to pass the GWIT test with no flame at a temperature greater than 650° C., a synergistic blend of polyphenylene ether and compatibilizer are required along with the polyamide and flameproofing agent. The inventive formulations each pass the indicated test at minimum temperatures of 725° C. Examples 2C and 3C each pass having an impressive temperature of 825° C.

TABLE 2

|  | Example 4 | Example 5 | Example 6 |
|---|---|---|---|
| Polyamide 2 | 44.75 | 44.75 | 44.75 |
| PPE | 44.1 | 39.2 | 34.3 |
| Compatibilizer | 0.9 | 0.8 | 0.7 |
| Flameproofing Agent | 10.0 | 15.0 | 20.0 |
| Lubricant 2 | .25 | .25 | .25 |
| Total Parts (weight) | 100.0 | 100.0 | 100.0 |
| GWIT with no flame @ 775° C. @ 2.0 mm | Pass | Pass | Pass |
| UL 94 V0 @1.5 mm | Pass | Pass | Pass |
| Moisture/% | 0.09 | 0.17 | 0.2 |
| HDT@ 1.8 MPa/° C. | 153 | 158 | 164 |
| Density/g/cc | 1.124 | 1.140 | 1.153 |
| Impact, notched IZOD | 3.9 | 4.2 | 3.7 |
| Tensile Strength | 66.2 | 61.9 | 57.6 |
| Elongation @ break | 13.1 | 7.8 | 5.1 |
| Elongation @ yield | 5.2 | 4.9 | 4.6 |
| Linear Shrinkage | 1.50 | 1.57 | 1.54 |
| Flex Modulus | 2,900 | 2,950 | 3,050 |
| Flex Strength | 88.8 | 89.2 | 87.7 |

Examples 4, 5 and 6 also illustrate inventiveness of the compositions of the present invention utilizing different polyamide and lubricant at different levels of polyphenylene ether, compatibilizer and flameproofing agent.

For the avoidance of doubt, the compositions, article and methods of the present invention encompass all possible combinations of the components, including various ranges of said components, disclosed herein. It is further noted that the term 'comprising' does not exclude the presence of other elements. However, it is also to be understood that a description of a product comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

What is claimed is:

1. A halogen free, flameproof, compatibilized polyamide and polyphenylene ether blend composition, comprising:
    a polyamide (co)polymer present in an amount from about 30 to about 80 parts, based on 100 parts by weight of the composition, wherein the polyamide (co)polymer is an aliphatic (co)polymer and is present as a continuous phase in the composition;
    polyphenylene ether in an amount from about 15 to about 50 parts based on 100 total parts by weight of the composition;
    a block copolymer compatibilizer derived from a i) the polyamide (co)polymer, ii) the polyphenylene ether, and a iii) a compatibilizer containing two different types of functional groups including a first functional group reactable with the i) polyamide (co)polymer and a second functional group reactable with the ii) polyphenylene ether, wherein the compatibilizer of the block copolymer compatibilizer is present in an amount of from about 0.1 to about 5 parts based on 100 parts by weight of the composition;
    a flameproofing agent that is a phosphinate present in an amount of from about 5 to about 35 parts based on 100 parts by weight of the composition;

wherein the composition is free of a halogen-containing flameproofing agent, and wherein a plaque or plate prepared from the composition passes a test according to GWIT IEC 60695-2-13 with no flame at 700° C. at a thickness of 2.0 mm.

2. The blend according to claim 1, wherein the polyamide (co)polymer is one or more of polyamide 6; polyamide 6,6; polyamide 4,6; polyamide 11; polyamide 12; polyamide 6,10; polyamide 6,12; polyamide 6/6,6; and polyamide 6/6,12.

3. The blend according to claim 2, wherein the flameproofing agent is one or more of aluminum diethyl phosphinate, zinc diethyl phosphinate calcium diethyl phosphinate, magnesium diethyl phosphinate, aluminum dipropyl phosphinate, isopropyl phosphinate, aluminum butyl phosphinate, aluminum methyl ethyl phosphinate, and aluminum phenyl phosphinate.

4. The blend according to claim 2, wherein the compatibilizer is one or more of a maleic acid, maleic anhydride, fumaric acid, citric acid, or citric anhydride.

5. The blend according to claim 4, polyamide copolymer has an amine group concentration of greater than or equal to 50 m.equivalents/kg.

6. The blend according to claim 1, wherein the plaque or plate prepared from the composition passes the test according to GWIT IEC 60695-2-13 with no flame at 750° C. at a thickness of 2.0 mm.

7. The blend according to claim 6, wherein the plaque or plate prepared from the composition passes a test according to GWIT IEC 60695-2-13 with no flame at 800° C. at a thickness of 2.0 mm.

8. The blend according to claim 1, wherein the polyamide (co)polymer is present in an amount from about 30 to about 70 parts, based on 100 parts by weight of the composition, wherein the polyphenylene ether is present in an amount from about 15 to about 50 parts based on 100 total parts by weight of the composition, wherein the compatibilizer is present in an amount of from about 0.2 to about 4 parts based on 100 parts by weight of the composition, and wherein the flameproofing agent is present in the amount of from about 7.5 to about 30 parts based on 100 parts by weight of the composition.

9. The blend according to claim 8, wherein the polyamide (co)polymer is present in an amount from about 32 to about 65 parts, based on 100 parts by weight of the composition, wherein the polyphenylene ether is present in an amount from about 20 to about 45 parts based on 100 total parts by weight of the composition, wherein the compatibilizer is present in an amount of from about 0.25 to about 3 parts based on 100 parts by weight of the composition, and wherein the flameproofing agent is present in the amount of from about 10 to about 25 parts based on 100 parts by weight of the composition.

10. The blend according to claim 1, wherein the composition further includes a lubricant.

11. The blend according to claim 1, wherein the polyphenylene ether is present as a discontinuous phase in the blend.

12. The blend according to claim 11, wherein the polyphenylene ether is one or more of poly(2,6-dimethyl-1,4-phenylene ether), poly(2-methyl-6-ethyl-1,4-phenylene ether), poly(2-methyl-6-phenyl-1,4-phenylene ether), and a copolymer of 2,6-dimethylphenol and another phenol.

13. The blend according to claim 1, wherein the compatibilizer is one or more of maleic acid, maleic anhydride, fumaric acid, citric acid, and citric anhydride.

14. The blend according to claim 1, wherein the first functional group is one or more of a carbon-carbon double bond and a carbon-carbon triple bond, and wherein the second functional group is one or more of a carboxyl group, an acid anhydride, an epoxy group, an amide group, an ester group, and an acid chloride.

15. The blend according to claim 1, wherein the polyamide copolymer has an amine group concentration of greater than or equal to 50 m.equivalents/kg.

16. The blend according to claim 15, wherein the polyamide copolymer has an amine group concentration of greater than or equal to 60 m.equivalents/kg.

17. A method for forming the blend of claim 1, comprising the steps of:

reacting a portion of the polyphenylene ether with the compatibilizer prior to reacting with a portion of the polyamide copolymer thereby forming the block copolymer compatibilizer.

18. The method according to claim 17, wherein the blend is extruded, wherein a portion of the polyphenylene ether and compatibilizer are combined in an upstream feed location and the polyamide (co)polymer is added downstream after the portion of the polyphenylene ether and the compatibilizer have been reacted.

19. A halogen free, flameproof, compatibilized polyamide and polyphenylene ether blend composition, comprising:

a polyamide (co)polymer present in an amount from about 30 to about 80 parts, based on 100 parts by weight of the composition, wherein the polyamide (co)polymer is an aliphatic (co)polymer and is present as a continuous phase in the composition;

polyphenylene ether in an amount from about 15 to about 50 parts based on 100 total parts by weight of the composition;

a block copolymer compatibilizer derived from a i) the polyamide (co)polymer, ii) the polyphenylene ether, and a iii) a compatibilizer containing two different types of functional groups including a first functional group reactable with the i) polyamide (co)polymer and a second functional group reactable with the ii) polyphenylene ether wherein the compatibilizer of the block copolymer compatibilizer is present in an amount of from about 0.1 to about 5 parts based on 100 parts by weight of the composition;

a flameproofing agent that is a phosphinate present in an amount of from about 5 to about 35 parts based on 100 parts by weight of the composition;

wherein the composition is free of a halogen-containing flameproofing agent;

wherein a plaque or plate prepared from the composition passes a test according to GWIT IEC 60695-2-13 with no flame at 700° C. at a thickness of 2.0 mm; and, wherein the composition is free of fillers.

20. The blend according to claim 19, wherein the polyamide (co)polymer is one or more of polyamide 6; polyamide 6,6; polyamide 4,6; polyamide 11; polyamide 12; polyamide 6,10; polyamide 6,12; polyamide 6/6,6; and polyamide 6/6,12, and wherein the flameproofing agent is one or more of aluminum diethyl phosphinate, zinc diethyl phosphinate calcium diethyl phosphinate, magnesium diethyl phosphinate, aluminum dipropyl phosphinate, isopropyl phosphinate, aluminum butyl phosphinate, aluminum methyl ethyl phosphinate, and aluminum phenyl phosphinate.

21. The blend according to claim 20, wherein the polyphenylene ether is one or more of poly(2,6-dimethyl-1,4-phenylene ether), poly(2-methyl-6-ethyl-1,4-phenylene ether), poly(2-methyl-6-phenyl-1,4-phenylene ether), and a copolymer of 2,6-dimethylphenol and another phenol, and wherein the compatibilizer is one or more of maleic acid, maleic anhydride, fumaric acid, citric acid, and citric anhydride.

22. The blend according to claim 21, wherein the polyamide (co)polymer is present in an amount from about 30 to about 70 parts, based on 100 parts by weight of the composition, wherein the polyphenylene ether is present in an amount from about 15 to about 50 parts based on 100 total parts by weight of the composition, wherein the compatibilizer is present in an amount of from about 0.2 to about 4 parts based on 100 parts by weight of the composition, and wherein the flameproofing agent is present in the amount of from about 7.5 to about 30 parts based on 100 parts by weight of the composition.

23. The blend according to claim 22, wherein the polyamide (co)polymer is present in an amount from about 32 to about 65 parts, based on 100 parts by weight of the composition, wherein the polyphenylene ether is present in an amount from about 20 to about 45 parts based on 100 total parts by weight of the composition, wherein the compatibilizer is present in an amount of from about 0.25 to about 3 parts based on 100 parts by weight of the composition, and wherein the flameproofing agent is present in the amount of from about 10 to about 25 parts based on 100 parts by weight of the composition.

\* \* \* \* \*